United States Patent [19]

Yamane

[11] Patent Number: 4,555,410

[45] Date of Patent: Nov. 26, 1985

[54] PROCESS FOR THE PRODUCTION OF CONTROLLED FREEZING POINT DRIED FOODS

[76] Inventor: Akiyoshi Yamane, 577-1, Yonehara, Yonago-Shi, Tottori Prefecture, Japan

[21] Appl. No.: 525,678

[22] Filed: Aug. 23, 1983

[30] Foreign Application Priority Data

Aug. 31, 1982 [JP] Japan ............................. 57-150015

[51] Int. Cl.$^4$ ............................ A23C 1/08; A23L 3/36
[52] U.S. Cl. ..................................... 426/384; 426/524
[58] Field of Search ............... 426/384, 385, 524, 418, 426/640

[56] References Cited

U.S. PATENT DOCUMENTS 2,640,333  6/1953  Bailey ................................. 426/524

FOREIGN PATENT DOCUMENTS 940003  10/1963  United Kingdom ............... 426/384

*Primary Examiner*—George Yeung
*Attorney, Agent, or Firm*—Browdy and Neimark

[57] ABSTRACT

A controlled freezing-point dried food accompanied with its original freshness and having an excellent restoration ability to its original state is obtained by treating a fresh food in the presence of a freezing-point depression agent at a temperature of 0° C. to a temperature in the range of the freezing-point controlled temperatures for prolonged period of hours without it being frozen thereby to make the food accompanied with cold-resistance, to maintain its original freshness and to improve its flavor and tastes and blowing chilled air of minus 5° C. to 10° C. with a stream rate of 0.5 m/sec. to 5 m/sec. onto the food for 5 to 600 hours.

2 Claims, 14 Drawing Figures

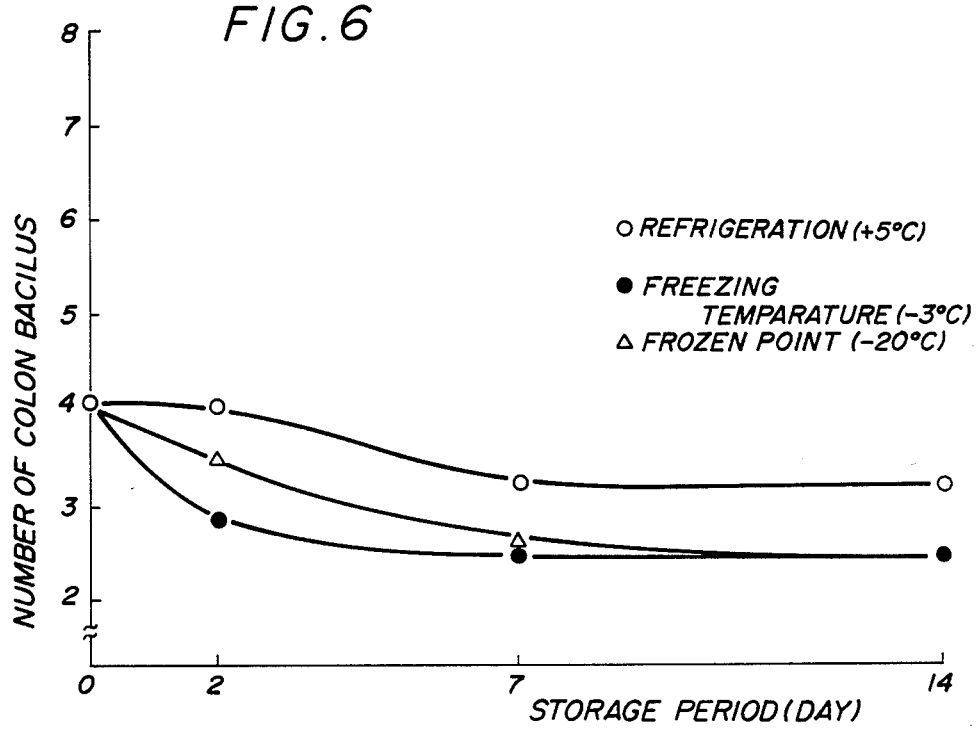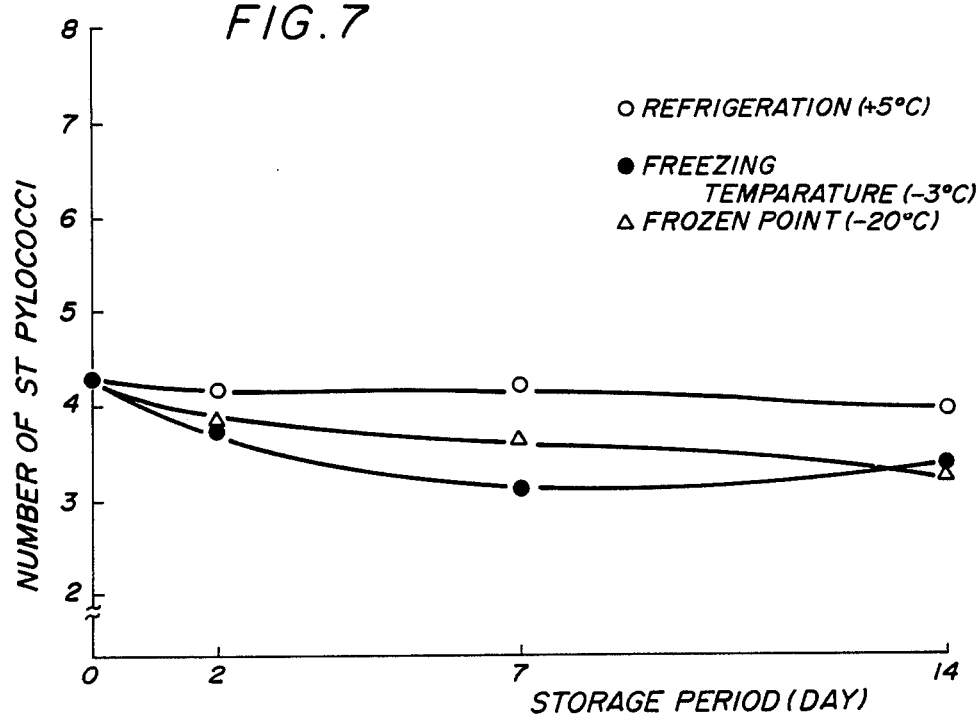

PROCESS FOR THE PRODUCTION OF CONTROLLED FREEZING POINT DRIED FOODS

FIELD OF THIS INVENTION

This invention relates to a process for the production of dry foods of which freshness, flavour and tastes may be preserved for a long period. More particularly it relates to a process of drying porishable foods or processed foods with air of controlled freezing point so that the dried foods may be preserved for a long period without deterioration with maintaining their original freshness, flavour and tastes.

PRIOR ARTS

There are known heated-air drying method, cooled-air drying method and vacum drying method for the production of dried foods. In any of such known drying methods, as the temperature range to be employed is of a plus-temperature being fairly above zero centigrate deterionation of heat sensitive substances occurs during process because of the temperature to be employed that leads not only to insufficient restorations of a dried product to the original state but also to incifficient maintenance of the original freshness, flavour and tastes. Others than the said known drying methods, there are also kown various freeze-drying methods for the production of dried foods wherein a temperature of below zero centigrade is employed. But for implementation of any such known freeze-drying method a specific costly installation is required that invites certain burden on its running which follows a cost on a final dried product accordingly. In addition, known freeze-dryng method often brings about destruction of constituents' cells of a food to be dried during its freeze-drying treatment which causes to lose tangue's and teeth's tauch feelings of the original food. The inventor of this invention previously provided the improved food preservation method under which fruits and vegetables may be preserved for prolonged period of time without loss of their freshness. That method is set forth in Japanese Patent Publication No. 56 (1981)-36887 that fruit or vegetable is immersed in a solution of a freezing point depression agent such an sugar or salt solution of which concentration is fairly excessive over that of the fruite's or vegetable's juice followed by standing still at a temperature of below zero centigrate while not allowing the fruite or vegetable to be frozen. The inventor of the present invention made further improvement to his said invention as set forth in Japanese Patent Publication 53 (1978)-46897 that in order to prevent fresh fruits or vegetables from softening or shrinking due to the occurance of dehydration phenomena when the content of the freezing point depression agent is invensed to lower a freezing point in the said food preservation method that fresh fruits or vegetables are subject to gradual cooling treatment without allowing them freezed at a temperature below zero centigrate the fresh fruit or vegetables are immersed in a solution of an enzyme such as pectinase or cellulose prior to the gradual cooling treatment thereby to preserve the fresh fruits or vegetables. Preserved foods to be provided according to the said methods mean such that the controled freezing point which fruit or vegetable has is artifically lowered as much as possible while reflecting on its physiological natures by immersing it in a solution of a freezing point depression agent thereby to add cold-resistance to the fruit or vegetable, successively subjected to the gradual-cooling trearment at a temperature ranging from 0° C. to the controled freezing point for the fruit or vegetable as concerned and finally stored at a temperature within the range of the freezing points as esterblished according to the fruit or vegetable. These preserved foods are commonly called by the name of "Controled Freezing Storage of Fruits or Vegetables" since they are preserved at a temperature within the range of the freezing-points so established with use of a freezing-point depression agent for them.

SUMMARY OF THE INVENTION

An object of this invention is to provide long-period storable foods while preserving their original freshness, flavour and tastes. Another object of this invention is to provide a method to produce the said foods that the freezing point of a food to be purposely reduced to a lower level as much as possible with due regard to the food's physiological aspects namely without hindering the food's properties physiological by use of a freezing-point depression agent, the food is then cooled at a temperature within the range of the controlled freezing-point to be accompanied with cold-resistance and to be improved with its foavour and taste and chilled air of $-0.5°$ to $-10°$ C. is blown onto the cooled food for 5 to 600 hours which is finally dried. The flow rate of the chilled air to be employed is 0.5 m/sec to 5 m/sec.

BRIEF DESCRIPTION OF THE DRAWING

In the drawing:

FIG. 6 is graph showing the influences of respective temperature on colon bacilli contained in fowl meat, FIG. 7 is graph showing the influences of respective temperature on stapylococci contained in fowl meat.

DETAILED DESCRIPTION

Figure 1:
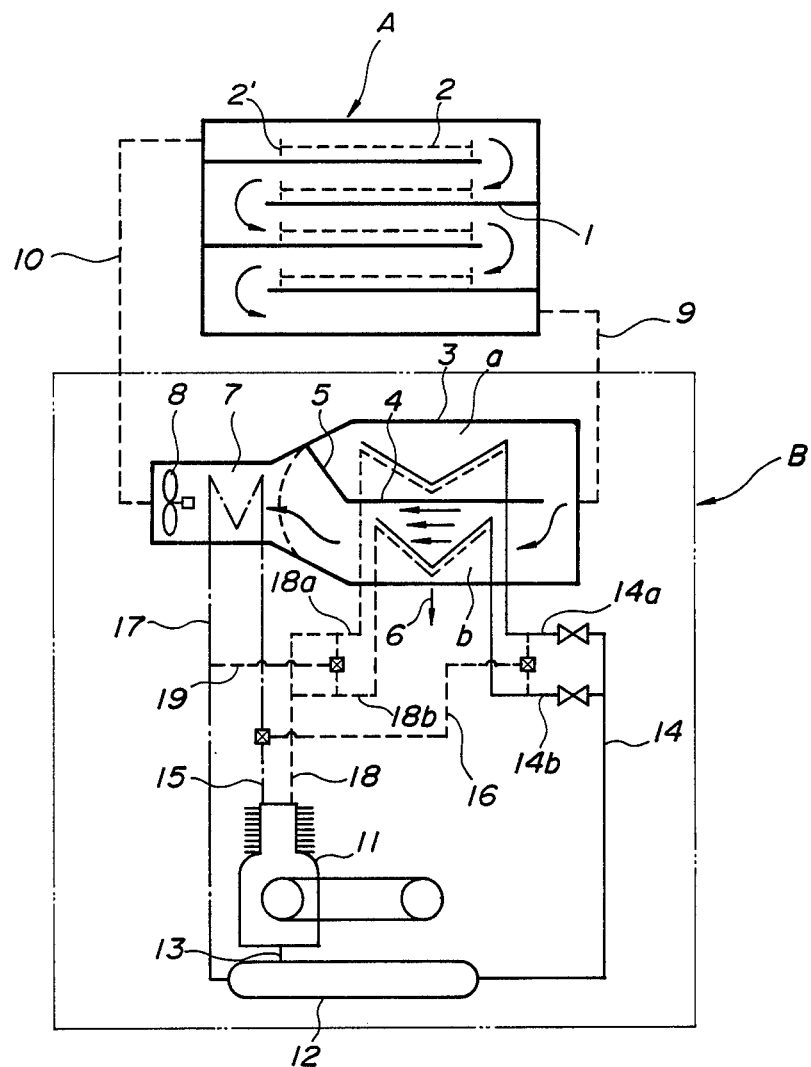
FIG. 1 is brief view of known drier to be employed to freeze-dry the freezing-point controlled food in this invention.

The Freezing-point control treatment of a food in this invention means that the freezing-point of the food involved is extended to lower level as much as possible with a freezing-point depression agent without damaging the physiological natures of the food and the food thus treated is cooled at a temperature ranging from 0° C. to the extended freezing-point (this extended range of temperature is hereinafter referred to as "freezing-point controlled temperature range" or "freezing temperature range") in the presence of the freezing-point depression agent for prolonged hours without permitting the foods frozen. To conduct cooling treatment on a food at a temperature of the freezing-point controlled temperature range for longer hours (preferably at least 10 hours) in this invention is not only to add cold-resistance and prolonged storability to fresh foods or processed foods which are usually accepted as not having been dried without having them frozen but also to improve (or ripen) their flavour and tastes. When animal protein such as meat is stored at positive temperatures its tastes will be improved by the enzymes contained therein, but beforehand common bacteria, pathogenic bacteria, fungi etc. will be multiplied thereby to cause reduction of its freshness and its putrefaction. The said cooling treatment according to this invention acts to prevent a food from being multiplied with the microorganisms as contained, and in the food on which that cooling treatment was made there is found increase of amino-form nitrogen which invites improvement of its tastes. The said fresh foods mean whole thing, skinned or cut part in any shape of fruits such as pear, apple, cherry, melon, grape, orange, strawberry etc., vegetables such as tomato, lettuce, asparagus, cauliflower, potato, carot, celery, onion etc., and daily bonned meats, and cut meats or any shape of meats for fillet, fricasee, stake or stew of fishes and shellfishes such as sardine, flatfish, tuna, lobster, scallop etc. and of birds and beasts such as fowl, cow, pig, etc. The said processed foods mean marine kneaded products such as fish sausage, ham, paste, boiled paste etc., meat kneaded products such as sausage, press ham etc., vermicellis such as noodle, macaroni etc. and bread products such as usual bread, danish pastry, croissant, bread dough etc. and other kind processed wheat-flower products. As the said freezing-point depression agent to be used in this invention there are sodium chloride, sucrose, sorbitol, sodium lactate, amino acids such as glutamic acid, glycine, alanine, asparaginic acid, leucine, isoleucine, valine etc. which are suitable to reduce the freezing (setting)-point of a food and do not damage the quality of the food. In this invention, of the said substances suitable one or more are selectively used with rogard of the food to be treated. In the freezing-point controlling treatment in this invention, if the fresh foods are fruites or vegetables they, as they are or in relevant shape, are immersed and stayed still in a solution of a freezing-point depression agent for a fixed period of hours, if the fresh foods are of fishes, shellfishes, birds or leasts their meats in relevant shape or form are either directly immersed and stayed still in a solution of a freezing-point depression agent for a fixed period of hours or sprayed and mixed with the said solution then standed still for a fixed period of hours. In case of processed foods, a freezing-point depression agent is added to particles of the meats during their mixing or kneading process and the resulting processed foods are kept stored for a fixed period of hours.

Figure 2:
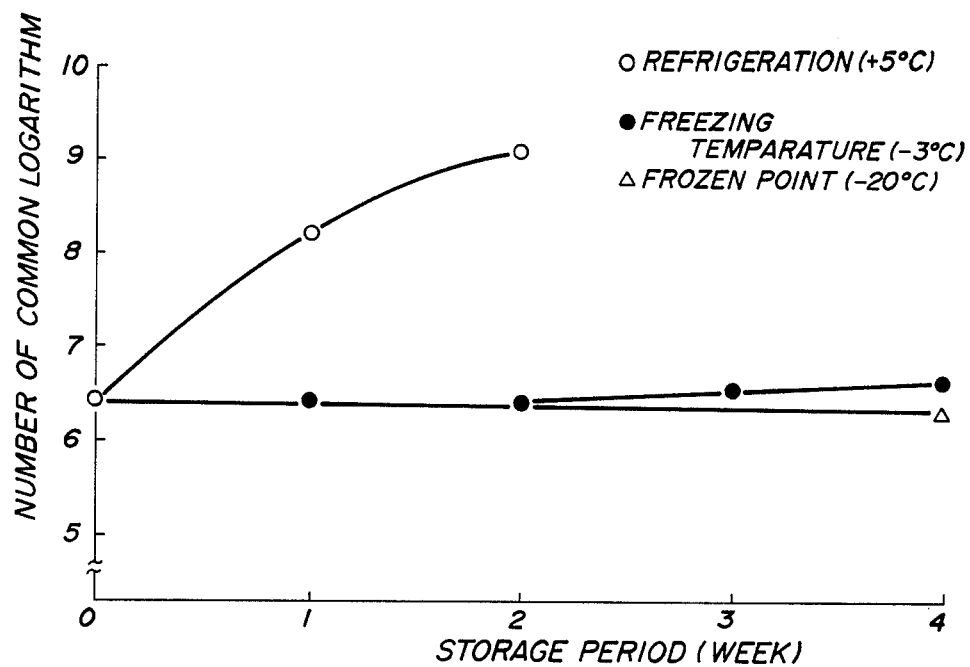
FIG. 2 is graph showing the influences of respective temperature on bacteria contained in flat-fish meat.
Figure 3:
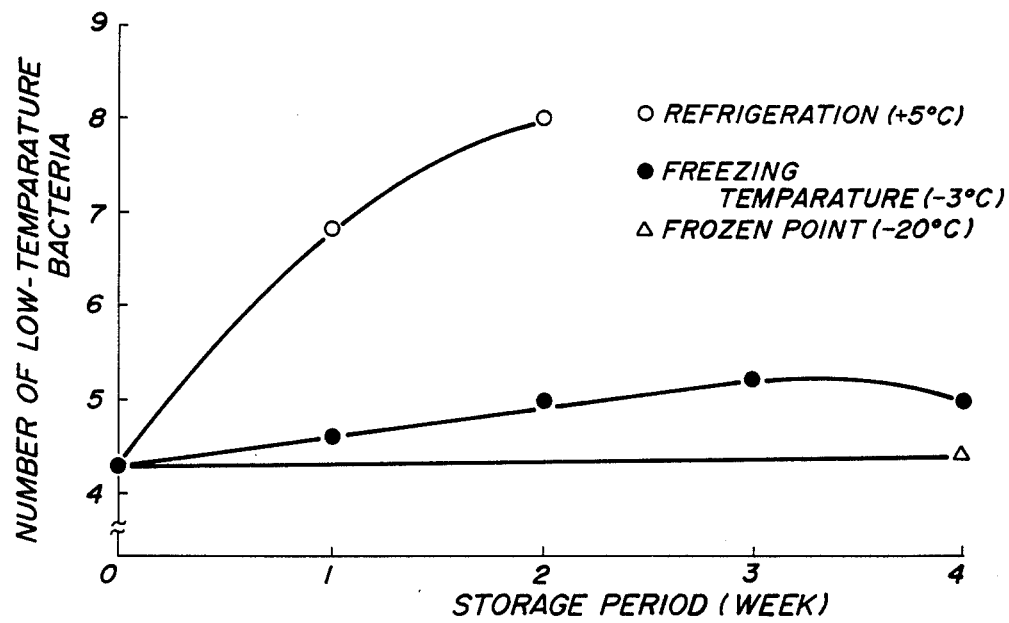
FIG. 3 is a graph showing the influences of respective temperature on low temperature bacteria contained in flat-fish meat.
Figure 4:
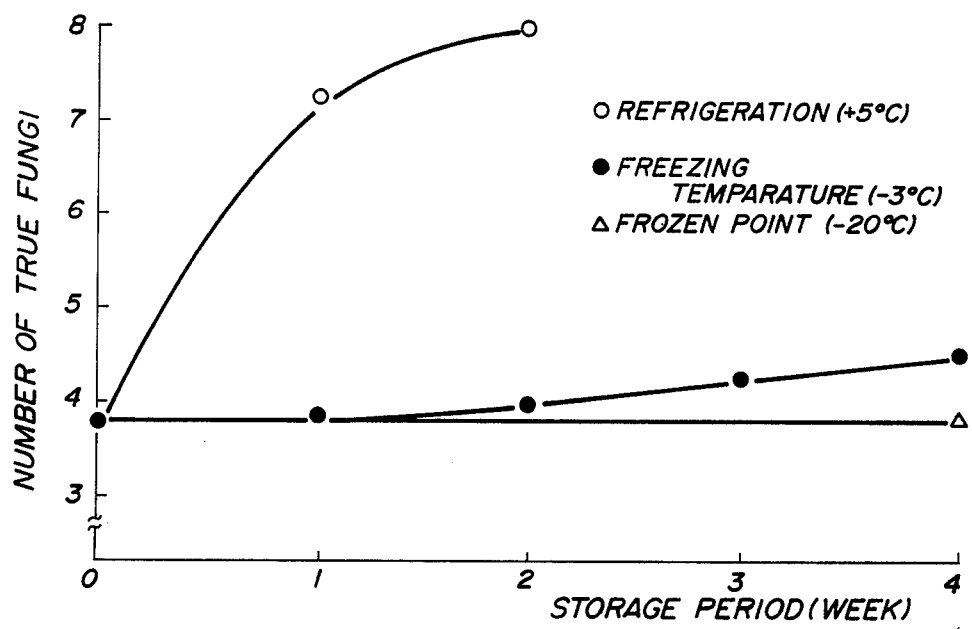
FIG. 4 is graph showing the influences of respective temperature on true fungi contained in flat-fish meat.
Figure 5:
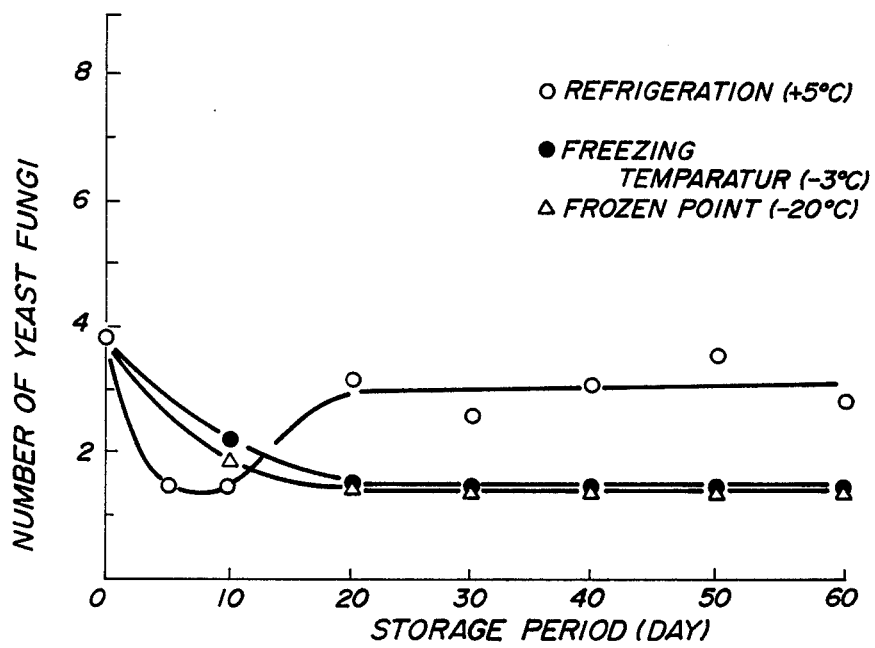
FIG. 5 is graph showing the influences of respective temperature on yeast fungi contained in turnip pickle.
Figure 8:
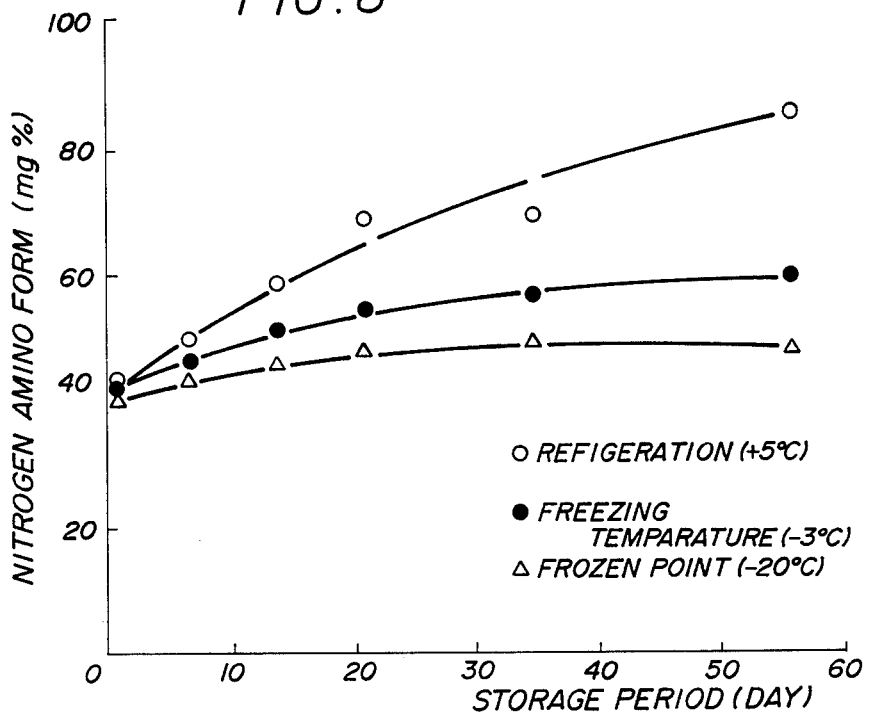
FIG. 8 is graph showing the changes of amino-form nitrogen of a fresh protein food at respective temperature.
Figure 9:
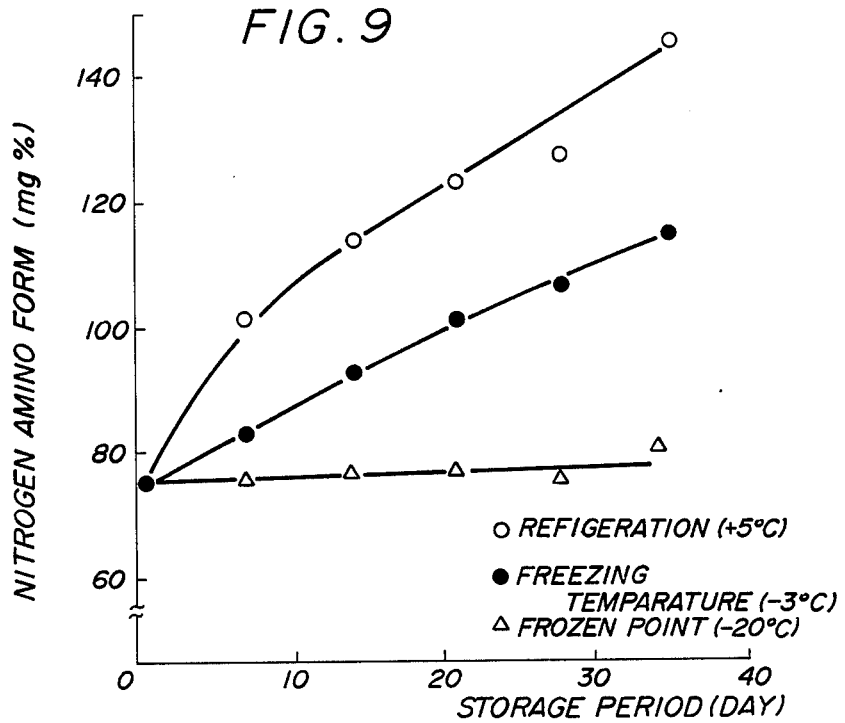
FIG. 9 is graph showing the relationship between the changes of amino-form nitrogen of a fresh protein food and respective temperature.
Figure 10:
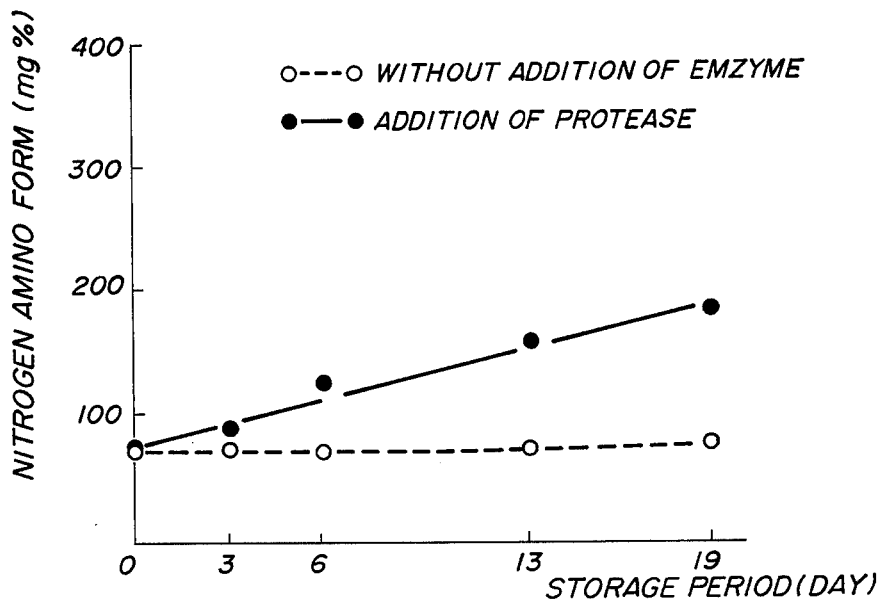
FIG. 10 is graph showing the changes of amino-form nitrogen of sardine with and without addition of protease.
Figure 11:
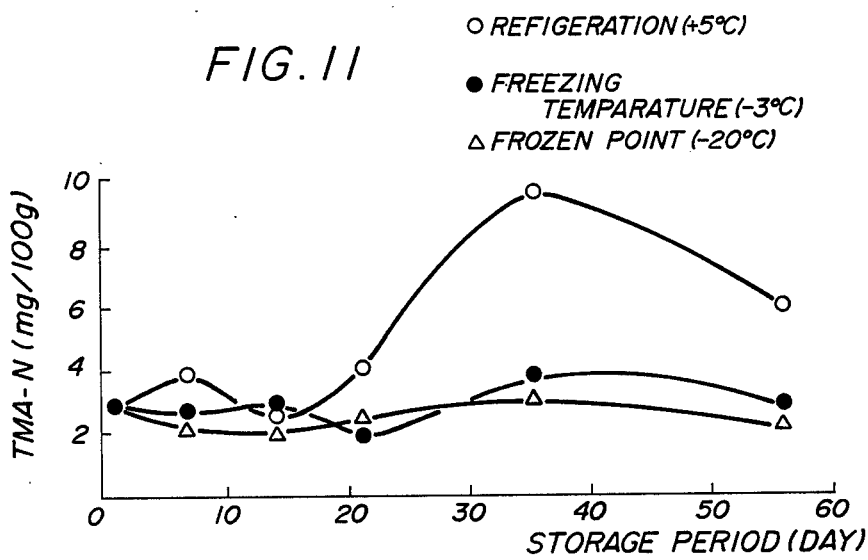
FIG. 11 is graph showing the changes of TMA-N of sardine at respective temperature.
Figure 12:
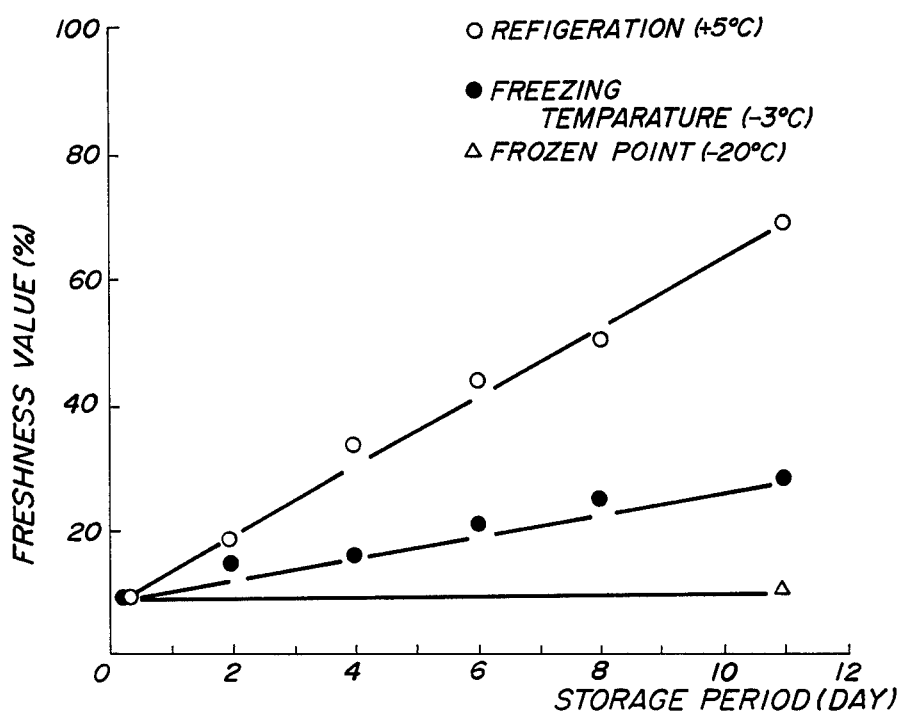
FIG. 12 is graph showing the changes of freshness (K value) of sardine at respective temperature.

In order to reduce the freezing-point of a food to a lower extent and to air-dry the food as treated in that way at a temperature at 0° C. or a temperature below zero centigrade in this invention, any known method to do this may be employed but it is preferred to use freezing-temperature drying apparatus as shown in FIG. 1. The said apparatus is provided with drying chamber A to dry a food to be dried and cooling device B to generate cooling-air and to recycle that air. In the drawing, 1 stands for maltiple number of drying-shelves installed within drying chamber A, 2 stands for wire-net tray placed over said drying-shelf being supported by leg 2' which spaces suface of said drying-shelf from behind surface of wire-net tray 2. 3 stands for refrigerant volatilizing device having defroster where air from drying chamber A is cooled by vapor volatilized from a refrigerant and demoistured, in the front of which re-heater 7 with which fan 8 is provited is installed. In refrigerant volatizing device 3, this is installed boundary fence 4 in the direction of air being blown which forms passages a and b. In addition, in the front portion of refrigerant valatilizing device 3 there is installed air-direction adjusting plate 5. When passage a is closed by said plate (during which defrosting is carried out in passage a), another passage b is opened (wherein air from drying chamber A is cooled then sent to re-heater 7) or vis-a-vis. 6 stands for drain for passages a and b. Re-heater 7 is to adjust excessively cooled air from refrigerant volatilizing device 3 to that of a pre-determined temperature with high-pressure high-temperature refrigerant gas (for example air of −19° C. is adjusted to that of −1.0° C.). Fan 8 is not only to send air of a adjusted temperature from re-heater 7 in the predetermined amount to drying chamber A but to recycle that air to drying chamber A, refrigerant volatilizing device 3 and re-heater 7. 9 stands for air-passage from drying chamber A through refrigerant volatilizing device. 10 stands for passage of low-temperature dry-air to be sent from fan 8 to drying chamber A. 11 stands for compressor of volatilized refrigerant from refrigerant volatilizing device 3, the high-pressure high-temperature gas as compressed in which being supplied to condencer 12, re-heater 7, passage a or passage b of refrigerant volatilizing device 3 which respectively acts as defrosting means. 13 stands for volatilized refrigerant passage from compressor 11 through condenser 12. 14 stands for passage of the liquified refrigerant from condencer 12 to passage a or passage b of refrigerant volatilizing device 3. 15 stands for passage of volatilized refrigerant for heat from compressor 11 through re-heater 7. 16 stands for passage of volatilized refrigerant for defrosting which is branched from passage 15 through valve means, being connected to conduits 14a and 14b directing respectively passage a and passage b of refrigerant volatilizing device 3 which are lined to liquified refrigerant passage 14. 17 stands for refrigerant passage from re-heater 7 through condencer 12. 18 stands for passage of refrigerant sent through passages 18a and 18b from passages a and b of refrigerant volatilizing device 3 connecting compressor 11. 19 stands for a passage being cannected to passages 18a and 18b and refrigerant passage 17 and which passes used refrigerant for defrosting in either passage a or passage b to passage 17 through valve means. The mark ← means the stream direction of air. This apparatus is so stuctured that all rotation rate of fan 8, heat of the air from refrigerant volatilizing device 3 in re-heater 7, control of the air-cooling and defrosting in refrigerant volatilizing device 3, changing-over of the air-cooling and defrosting to be conducting in refrigerant valatilizing device 3 and changing the valves provided on the passages may be automatically cordinated relatively one from another. For freezing-point controlled food to be successively dried by use of the apparatus in this invention, the food is placed on the wire-net tray which is followed put on the shelf. Then, suitable conditions for freeze-drying the food e.g. −15° C., 40% of moisture and 2.5 m/sec. of air-stream rate are selected and the apparatus is put in operation. Cooling device B is operated and, when the air from drying chamber A passes passage b (passage a is being closed by air-direction adjusting plate 5), it is cooled with oiquified refrigerant from condencer 12, entered in re-heater 7 where the cooled air is adjusted to that of pre-determined temperature e.g. −1.5° C. with bolatilized refrigerant from compressor 11, which is supplied by the stream rate of 2.5 m/sec. into drying chamber A to dry the food. The cooled air used for drying the food is recycled to passage b. When the cooling pipe of passage b is frosted, passage a (which has being closed) is opened while closing passage b by the action of air-direction adjusting plate 5 during which period that cooling pipe is defrosted. Then the freeze-drying process is continued in the same way as above stated. The defrosting treatment in b as closed is implemented by passing high-pressure high-temperature refrigerant gas to branched passage 14b of passage 14 from compressor 11 to refrigerant volatilizing device 3. To passage a where air is being cooled liquified refrigerant front condencer 12 is sent through passage 14 and branched passage 14a. The results of Experiments on prevention of microorganisms' multiplieation by the cooling treatment according to this invention are hereunder explained in accordance with the attached Figures. FIGS. 2, 3 and 4 are the graphs of the experimental results when gutted flat-fish over which salt powder was dusted was stored at plus 5° C. (refrigeration temperature), minus 3° C. (a temperature in the range of the freezing-point controlled temperatures) and minus 20° C. (frozen temperature) respectively. FIG. 2 stands for the influences of respective temperature on bacteria. FIG. 3 stands for the influences of respective temperature on low-temperature vacteria. FIG. 4 stands for the influences of respective temperature on true fungi. FIG. 5 is the graph of the experimental results when turnip pickle was stored at plus 5° C. (refrigeration temperature), minus 3° C. (a temperature in the range of the freezing-point controlled temperatures) and minus 20° C. (frozen temperature) respectively and stands for the influences of respective temperature on yeast fungi. FIGS. 6 and 7 are the graphs of the experimental results when fowl meat after having been immersed in 3% salt solution was stored at plus 5° C. (refrigeration temperature), minus 3° C. (a temperature in the range of the freezing-point controlled temperatures) and minus 20° C. (frozen temperature) respectively. FIG. 6 stands for the influences of respective temperature on colon bacilli and FIG. 7 stands for the influences of respective temperature on stapylococci. From the experimental results as shown FIGS. 2–7, it is understood that the cooling treatment according to this invention preventes multiplication of the microorganisms contained in a fresh food and stop their actions without it being frozen. The experimental results on the ripening effect due to the cooling treatment according to this invention and the ripening promotion effect with addition of protease on fresh protein foods are shown FIGS. 8, 9 and 10. FIG. 8 is the graph showing the experimental results when sardine after having been immersed in 5% salt solution was stored at plus 5° C. (refrigeration temperature), minus 3° C. (a temperature in the range of rhe freezing-point controlled temperatures) and minus 20° C. (frozen temperature) and stands for changes of amino-form nitrogen at respective temperature. FIG. 9 is the graph showing the experimental results when broiler meats after having been immersed in 5% salt solution were stored at plus 5° C. (refrigeration temperature), minus 3° C. (a temperature in the range of freezing-point controlled temperatures) and minus 20° C. (frozen temperature) and stands for the relationship of the changes of amino-form nitrogen to the said temperatures. [Measurement of the factors on the samples in the above experiments was carried out in accordance with Balance-Like Measuring Method.] In the experiments for FIGS. 8 and 9, improvement of the tastes was recognized on the meats in unfrozen state. Further, improvement of the flavour and tastes was recognized by panel tests also on the fruits and vegetables which were stored at a temperature in the range of the freezing-point controlled temperatures for prolonged hours, and at the same time it was recognized that the said cooling treatment made them ripened advantageously. Additionally, as the results of the experiment on the changes of amino-form nitrogen of sardine fillets, on which protease was supplied in order to promote its ripening effects by the cooling treatment, under storage (ripening) at a temperature in the range of the freezing-point controlled temperatures, improved ripening effects due to addition of an enzyme were recognized on the said sardine fillets in the unfrozen state of below zero temperature as shown in FIG. 10. In the said experiment, the amount of an enzyme to have been added was 0.1% by volume and 5% by weight of salt was supplied by spray on the said sardine fillets. The temperature to have been employed for the cooling treatment was minus 3° C. Adding here to say, it was recognized that the duration of storage (ripening) of a fresh protein food at a temperature in the range of the freezing-point controlled temperatures is preferred to be 30–100 days in ease where only the self-controlled enzymes are used and to be 1–20 days in ease where 0.01 to 0.1% weight of protease is added. The results from the experiments which were carried out on the freshness maintaining effects to fresh foods which are commonly not dried to be accepted by the cooling treatment according to this invention are shown in FIGS. 11 and 12. FIG. 11 is the graph which shows the changes of trimethylamine (TMA)-N of sardine, to which 5% by weight of salt was added by spray, when stored at each temperature of plus 5° C., minus 3° C. and minus 20° C. The measurement of the changes of TMA-N was carried out in accordance with Conway Microanalytic Diffusion Method. FIG. 12 is the graph which shows the changes of freshness (K value) of sardine, to which 5% by weight was added by spray, when stored at each temperature of plus 5° C., minus 3° C. and minus 20° C. The measurement of K value of the said sardine was carried out in accordance with known measuring method:

$$K(\%) = \frac{HXR + HX}{ATP + ADP + AMP + IMP + HXR + HX} \times 100$$

Figure 13:
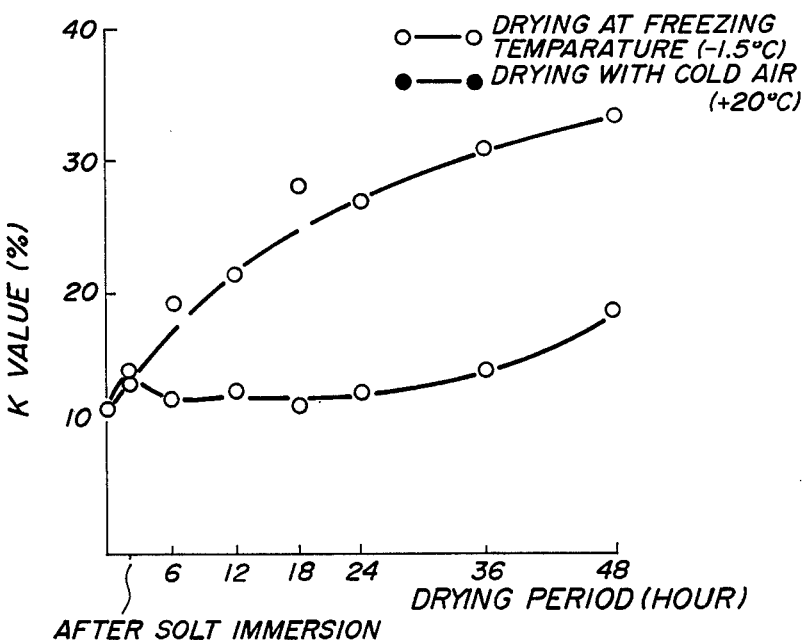
FIG. 13 is graph showing the changes of K value of sardine at respective temperature.
Figure 14:
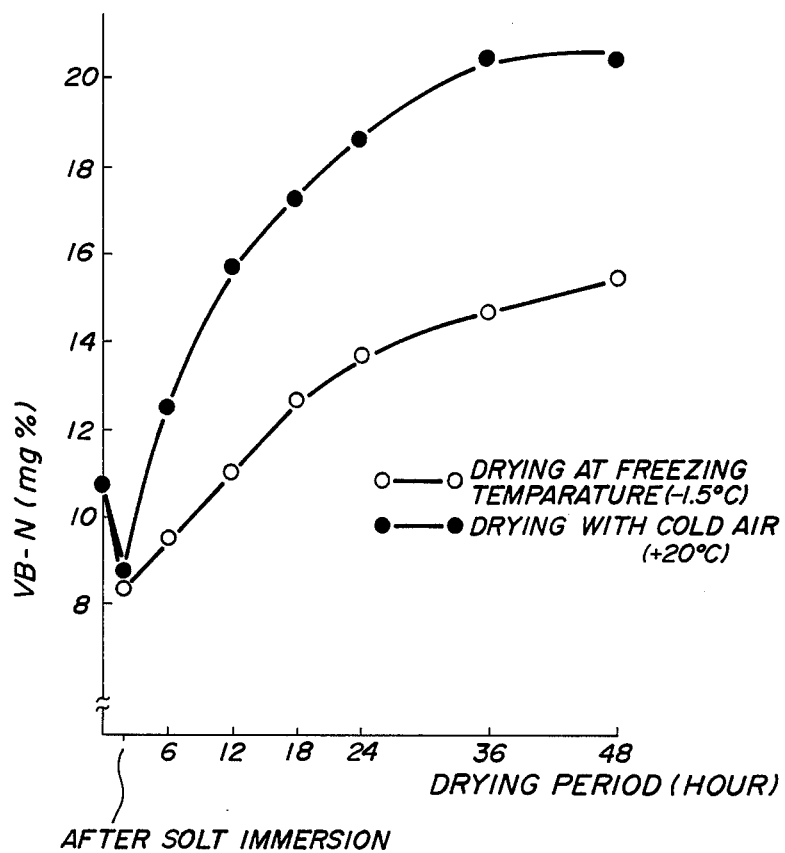
FIG. 14 is graph showing the changes of VB-N of sardine at respective temperature.

As being understood from FIGS. 11 and 12, the cooling treatment at minus 3° C. (a temperature in the range of the freezing-point controlled temperatures) makes a fresh food maintained with its freshness in remarkably good state without it being frozen in comparison with the case where it is stored at refrigeration temperature of plus 5° C. FIGS. 13 and 14 show the changes of the freshness of the sardine treated at a temperature in the range of the freezing-point controlled temperatures during it being air-dried with air of minus 1.5° C. and of plus 20° C. by a stream rate of 0.5 m/sec. to 5 m/sec. FIG. 13 is the graph which shows the changes of K value (%) of the sardine which was measured in addordance with the said food's freshness (K value) measuring method. FIG. 14 is the graph which shows the changes (mg%) of volatile basic nitrogen (VB-N) of the sardine after removal of protein with a trichloroacetate solution which was measured in accordance with the above-said Microanalytic Diffusion Method. It can be understood from any of the above cases that air-drying a food with chilled air of below zero centigrade namely minus 5° C. at lowest minus 10° C. according to this invention is much superior to known air-drying method of a food for maintenance of the food's quality in stable state during the air-drying process. Further, as for the changes of the viable count during air-drying process, it can be understood from the following table that the former is much superior to the latter.

TABLE

Changes of the viable count of a food during it being air-dried count/g

| Temperature | Sample | After freezing-point reduction treatment | Drying Hours | | | | | |
|---|---|---|---|---|---|---|---|---|
| | | | 6 | 12 | 18 | 24 | 36 | 48 |
| −15° C. | $6.2 \times 10^3$ | $4.3 \times 10^3$ | $4.8 \times 10^3$ | $1.7 \times 10^3$ | $0.7 \times 10^3$ | $2.0 \times 10^2$ | $1.4 \times 10^2$ | $1.1 \times 10^2$ |
| −20° C. | " | " | $1.2 \times 10^4$ | $1.3 \times 10^4$ | $4.7 \times 10^4$ | $1.9 \times 10^4$ | $8.9 \times 10^4$ | $1.2 \times 10^4$ |

According to this invention, a dried food accompanied with its original freshness and having an excellent restoration ability to its original state may be obtained by treating a fresh food in the presence of a freezing point depression agent at a temperature of 0° C. to a temperature in the range of the freezing-point controlled temperatures for prolonged period of hours without it being frozen thereby to make the food accompanied with cold-resistance, to maintain its original freshness and to improve its flavour and tastes and blowing chilled air of minus 5° C. to 10° C. with a stream rate of 0.5 m/sec. to 5 m/sec. onto the food for 5 to 600 hours. In order to indicate more fully the nature and utility of this invention, the following specific examples of practice constituting preferred embodiments of this invention are set forth, it being understood that these examples are presented as illustrative only and that they are not intended to limit the scope of this invention.

EXAMPLE 1

Drying of Fruite

Pear of which variety name is 20th century was sliced into thin slices with a thickness of 3 to 5 mm, the slices were immersed in 5 to 10% sugar solution and stored at −3° C. for 10 to 30 days. The pear slices thus treated were taken from the sugar solution then subject to air-drying while blowing chilled air of −1.5° C. with a stream rate of 3 m/sec. for 35 hours to obtain dried pear slices. For drying the pear slices which were immersed in 5 to 10% sugar solution and taken freezing-point adjustment treatment, the slices were arranged on wire-net tray of the previosly described apparatus and as the refrigerant Freon gas was used. And the temperature of the air which was used for freeze-drying the slices was −15° C. and its stream rate was 3 m/sec.

EXAMPLE 2

Drying Vegetables

Japanese radish and cabbage were separately cut into lumps with relevant size and were then immersed in 3% salt solution which followed by storage at −3° C. for 10 to 30 days. The lumps were removed from the salt solution and subject to air-drying by blowing by chilled air of −1.5° C. with a stream rate of 3 m/sec. for 35 hours to obtain a dried lump product respectively of Japanese radish and cabbage.

EXAMPLE 3

Drying Noodle

To 100 parts by weight of sheat flower, 40 parts by weight of water and 5 parts by weight of salt were added to obtain a mixture which was followed by kneading for 10 to 15 minutes. The resulting kneaded mixture was kept at −2° C. for 10 hours them pressed to be a wheat flower paste plate which was then cut into linear products. The linear products were subject to air-drying by blowing chilled-air of −2° C. with a stream rate of 1 m/sec. for 10 hours to obtain final linear products to be accepted as noodle.

EXAMPLE 4

Drying Dough for Bread

To 100 parts by weight of wheat flower, 60 parts by weight of water, 4 parts by weight of shortening oil, 2 parts by weight of yeast, 4 parts by weight of sugar and 2 parts by weight of salt were added to obtain a mixture which was then kneaded to produce a dough. The dough was stored at −2° C. for 10 days and divided into oumps of relevant size which were then fermented at 28° C. The fermented was subject to air-drying by blowing chilled air of −2° C. with a stream of 3 m/sec. for 10 hours to obtain a final product.

EXAMPLE 5

80 parts by weight of fowl meat, 10 parts by weight of fish meat and 10 parts by weight of soybean cake were mixed to obtain a mixture to which 5% by weight of garlic powder, 5% by weight of lard, 0.2% by weight of seasonings, 2.5% by weight of salt, 2% by weight of sodium lactate, 0.1% by weight of a coloring agent and 0.1% by weight of polymerized phosphate as a binder were added, and the resulting mixture was well mixed and kneaded. The resulting was kept at −3° C. for 50 hours and charged into a casing which was subject to air-drying by blowing chilled-air of −2° C. with a stream of 3 m/sec. for 3 weeks thereby to ripen the product, which was then heated at 73° C. for 105 minutes and finally cooled to obtain a product.

EXAMPLE 6

Drying Fish Sousage 100 parts by weight of fish ground meat, 0.2 parts by weight of sodium glutamate and 5 parts by weight of salt were well mixed to obtain a mixture to which 0.5% by weight of protease was added. The resulting was kept at −3° C. for 10 days. To 40 parts by weight of thus resulted, 30 parts by weight of raw ground fish meat and 30 parts by weight were added to obtain a mixture. The mixture was charged into a casing which was subject to air-drying by blowing chilled-air of −3° C. with a stream of 3 m/sec. for 3 weeks. The product thus obtained was heated at 73° C. for 105 minutes then cooled to obtain a final product.

EXAMPLE 7

Drying Fillet

To fillets of sardine or flat-fish, 5% by weight of salt, 0.5% by weight of glycine and 1.0% by weight of sorbital were added to obtain a mixture to which 0.1% by weight of protease was added. The resulting mixture was well mixed and then kept at −3° C. for 15 days. The product thus obtained was subject to air-drying by blowing chilled-air of −1.5° C. with a stream of 4 m/sec. for 70 hours to obtain a final product.

What is claimed is:

1. A process for the production of controlled freezing point dried food having its original freshness and having an excellent restoration ability to its original state, which comprises treating a fresh food to be dry-treated in the presence of an edible freezing-point depression agent at a temperature of 0° C. or below for at least 10 hours without freezing said fresh food to thereby make the food cold-resistant, to maintain its original freshness and to improve its flavor and taste and blowing chilled air at a temperature of −5° C. to −10° C. onto the food at a stream rate of 0.5 m/sec to 5 m/sec for 5 to 600 hours to freeze dry said food and thereby form a freeze-dried food.

2. A process as claimed in claim 1, wherein the edible freezing-point depression agent is a member selected from the group consisting of sodium chloride, sucrose, sorbitol, sodium lactate, glutamic acid, glycine, alanine, asparaginic acid, leucine, isoleucine, valine and mixtures thereof.

* * * * *